(12) United States Patent
Mo

(10) Patent No.: US 12,142,740 B2
(45) Date of Patent: Nov. 12, 2024

(54) BATTERY MODULE AND VEHICLE

(71) Applicant: CONTEMPORARY AMPEREX TECHNOLOGY (HONG KONG) LIMITED, Hong Kong (CN)

(72) Inventor: Weihua Mo, Fujian (CN)

(73) Assignee: CONTEMPORARY AMPEREX TECHNOLOGY CO., LIMITED, Hong Kong (CN)

( * ) Notice: Subject to any disclaimer, the term of this patent is extended or adjusted under 35 U.S.C. 154(b) by 0 days.

(21) Appl. No.: 17/563,883

(22) Filed: Dec. 28, 2021

(65) Prior Publication Data
US 2022/0123382 A1 Apr. 21, 2022

Related U.S. Application Data

(63) Continuation of application No. PCT/CN2020/118764, filed on Sep. 29, 2020.

(30) Foreign Application Priority Data

Nov. 19, 2019 (CN) .......................... 201922000319.5

(51) Int. Cl.
*H01M 10/00* (2006.01)
*H01M 10/42* (2006.01)
(Continued)

(52) U.S. Cl.
CPC ....... *H01M 10/486* (2013.01); *H01M 10/425* (2013.01); *H01M 10/625* (2015.04);
(Continued)

(58) Field of Classification Search
CPC ............. H01M 10/486; H01M 10/425; H01M 10/625; H01M 10/653; H01M 50/103;
(Continued)

(56) References Cited

U.S. PATENT DOCUMENTS

2005/0054240 A1 3/2005 Kubota et al.
2010/0309949 A1* 12/2010 Akaboshi ............ H01M 50/503
324/426

(Continued)

FOREIGN PATENT DOCUMENTS

CN 205863332 U 1/2017
CN 206806468 U 12/2017
(Continued)

OTHER PUBLICATIONS

Machine translation of JP 2016-162717 (Year: 2016).*
(Continued)

*Primary Examiner* — Nicholas P D'Aniello
(74) *Attorney, Agent, or Firm* — Venable LLP

(57) ABSTRACT

This application provides a battery module and a vehicle. The battery module includes a plurality of battery cells. Each battery cell includes a battery top cover; a thermally conductive sampling piece, fitting snugly with the battery top cover; a thermally conductive connecting plate, where one end of the thermally conductive connecting plate fits snugly with the thermally conductive sampling piece; a circuit board, disposed above the battery top cover, where another end of the thermally conductive connecting plate is connected to the circuit board; and a thermometric element, electrically connected to the circuit board. The thermometric element is configured to collect a temperature signal of the thermally conductive connecting plate and transmit the (Continued)

temperature signal to the circuit board. The battery module provided in this application facilitates real-time and accurate collection of battery temperatures.

12 Claims, 13 Drawing Sheets

(51) Int. Cl.
| | | |
|---|---|---|
| *H01M 10/48* | (2006.01) | |
| *H01M 10/625* | (2014.01) | |
| *H01M 10/653* | (2014.01) | |
| *H01M 50/103* | (2021.01) | |
| *H01M 50/15* | (2021.01) | |
| *H01M 50/209* | (2021.01) | |

(52) U.S. Cl.
CPC ....... *H01M 10/653* (2015.04); *H01M 50/103* (2021.01); *H01M 50/15* (2021.01); *H01M 50/209* (2021.01); *H01M 2010/4271* (2013.01); *H01M 2220/20* (2013.01)

(58) Field of Classification Search
CPC ............... H01M 50/15; H01M 50/209; H01M 2010/4271; H01M 2220/20; H01M 10/482; H01M 50/155; H01M 50/262; H01M 50/284; Y02E 60/10
See application file for complete search history.

(56) References Cited

U.S. PATENT DOCUMENTS

| | | | |
|---|---|---|---|
| 2012/0225334 A1* | 9/2012 | Lee ..................... | H01M 10/486 |
| | | | 429/62 |
| 2012/0251849 A1 | 10/2012 | Park et al. | |
| 2015/0044511 A1* | 2/2015 | Kim .................... | H01M 50/209 |
| | | | 429/7 |
| 2017/0271642 A1* | 9/2017 | Groshert ................ | B60L 50/64 |
| 2018/0034115 A1 | 2/2018 | Li et al. | |
| 2019/0237817 A1* | 8/2019 | Hammerschmied ........................ | |
| | | | H01M 10/425 |

FOREIGN PATENT DOCUMENTS

| | | |
|---|---|---|
| CN | 207183388 U | 4/2018 |
| CN | 207398245 U | 5/2018 |
| CN | 208128637 U | 11/2018 |
| CN | 210607433 U | 5/2020 |
| EP | 3316384 A1 | 5/2018 |
| JP | 2004186232 A | 7/2004 |

OTHER PUBLICATIONS

International Search Report mailed Dec. 31, 2020 in International Application No. PCT/CN2020/118764.
Extended European Search Report issued Apr. 28, 2022 in EP Application No. 20891229.5.

* cited by examiner

BATTERY MODULE AND VEHICLE

CROSS-REFERENCE TO RELATED APPLICATIONS

This application is a continuation of International Application No. PCT/CN2020/118764, entitled "BATTERY MODULE AND VEHICLE" filed on Sep. 29, 2020, which claims the priority of Chinese Patent Application No. 201922000319.5, entitled "BATTERY MODULE AND VEHICLE" filed on Nov. 19, 2019, both of which are incorporated herein by reference in their entireties.

TECHNICAL FIELD

This application relates to the technical field of battery preparing, and in particular, to a battery pack and a vehicle.

BACKGROUND

In a hard-case battery module, a temperature of electrical connecting plates connected to different battery cells is usually collected as a battery temperature. An electrical connecting plate is connected to an electrode terminal of a battery cell. Therefore, in most cases, an internal temperature of the battery cell can be conducted to the electrical connecting plate through the electrode terminal. However, under specific over-current working conditions, a sample temperature collected in such a way deviates considerably from an actual temperature inside the battery cell. For example, under an effect of a large impulse current in a short time, a temperature rise inside the battery cell is slow due to a large mass, but the electrical connecting plate generates a large amount of Joule heat due to a small mass. The heat cannot be quickly dissipated in a short time, resulting in a very sharp difference between the temperature of the electrical connecting plate and the internal temperature of the battery cell. In this case, the collected temperature of the electrical connecting plate cannot reflect the actual temperature inside the battery cell in real time.

SUMMARY

A first aspect of this application provides a battery module, including: a plurality of battery cells, where each battery cell includes a battery top cover; a thermally conductive sampling piece, fitting snugly with the battery top cover; a thermally conductive connecting plate, where one end of the thermally conductive connecting plate fits snugly with the thermally conductive sampling piece; a circuit board, disposed above the battery top cover, where another end of the thermally conductive connecting plate is connected to the circuit board; and a thermometric element, electrically connected to the circuit board, where the thermometric element is configured to collect a temperature signal of the thermally conductive connecting plate and transmit the temperature signal to the circuit board.

Therefore, an internal temperature of the battery cell can be reflected to the thermometric element through the thermally conductive sampling piece and the thermally conductive connecting plate. The thermometric element transmits a measured battery temperature signal to the circuit board to implement real-time and accurate collection of the temperature of the battery cell.

In some embodiments, the thermally conductive sampling piece includes a sampling block. A bottom of the sampling block fits snugly with the battery top cover. A top of the sampling block fits snugly with the thermally conductive connecting plate. The sampling block is simple in structure and is easy to manufacture and assemble.

In some embodiments, the thermally conductive sampling piece includes a sampling board. The sampling board is fixedly connected to the thermally conductive connecting plate.

In some embodiments, the sampling board includes a first sampling board fitting snugly with the battery top cover, a third sampling board fitting snugly with the thermally conductive connecting plate, and a second sampling board that connects the first sampling board and the third sampling board.

In some embodiments, the sampling board is bent. The first sampling board and the third sampling board are located on two sides of the second sampling board respectively, and extend in a direction away from the second sampling board.

In some embodiments, the thermally conductive sampling piece includes a bendable sampling piece crimping board disposed on the sampling board, and the sampling piece crimping board is bent to fit snugly with the thermally conductive connecting plate so as to connect the thermally conductive sampling piece and the thermally conductive connecting plate; and/or the thermally conductive connecting plate includes a thermally conductive connecting plate body and a bendable connecting plate crimping board disposed on the thermally conductive connecting plate body, and the connecting plate crimping board is bent to fit snugly with the thermally conductive sampling piece so as to connect the thermally conductive sampling piece and the thermally conductive connecting plate.

In some embodiments, the sampling piece crimping board includes a bendable sampling piece lug disposed on the sampling board; and/or the connecting plate crimping board includes a connecting plate lug disposed on the thermally conductive connecting plate body.

In some embodiments, the sampling piece crimping board includes a bendable sampling piece convex ring that extends from a face of the sampling board to a side away from the face, a sampling piece convex ring hole available for threading the sampling piece convex ring is disposed on the thermally conductive connecting plate, and the sampling piece convex ring is threaded through the sampling piece convex ring hole and then bent to fit snugly with the thermally conductive connecting plate so as to connect the thermally conductive connecting plate and the thermally conductive sampling piece; and/or the connecting plate crimping board includes a bendable connecting plate convex ring that extends from a face of the connecting plate body to a side away from the face, a connecting plate convex ring hole available for threading the connecting plate convex ring is disposed on the sampling board, and the connecting plate convex ring is threaded through the connecting plate convex ring hole and then bent to fit snugly with the thermally conductive sampling piece so as to connect the thermally conductive connecting plate and the thermally conductive sampling piece.

In some embodiments, the sampling board is connected to the thermally conductive connecting plate by a fastener and/or a binder.

In some embodiments, the thermally conductive connecting plate is a flat connecting plate or a bent connecting plate.

In some embodiments, the thermally conductive sampling piece includes a pedestal and a socket disposed on the pedestal. The pedestal fits snugly with the battery top cover, and the thermally conductive connecting plate is plugged into the socket and fits snugly with a sidewall of the socket.

In some embodiments, the thermally conductive sampling piece is formed by bending a strip-shaped plate. The strip-shaped plate is bent to form the thermally conductive sampling piece, so as to implement easy manufacturing and mounting as well as convenient and quick use.

In some embodiments, the thermally conductive connecting plate is a bent connecting plate, and includes a first connecting portion and a second connecting portion that is at an angle to the first connecting portion. The first connecting portion is plugged into the socket, and the second connecting portion is connected to the circuit board.

A second aspect of this application provides a vehicle, including: a power source, where the power source provides power to the vehicle; and the battery module according to the first aspect of this application, where the battery module is configured to provide electrical power to the power source.

In the battery module and the vehicle described above, a temperature sampling position of the battery module is arranged on a surface of the battery top cover of the battery cell. Heat inside the battery cell can be quickly conducted to the battery top cover. The thermally conductive sampling piece is disposed on and fits snugly with the battery top cover, and then the thermally conductive connecting plate that fits snugly with the thermally conductive sampling piece connects the thermally conductive sampling piece and the thermometric element. In this way, the internal temperature of the battery cell can be reflected to the thermometric element through the thermally conductive sampling piece and the thermally conductive connecting plate. The thermometric element transmits a measured battery temperature signal to the circuit board to implement sampling of the battery temperature. The temperature of the battery top cover is generally not inconsistent with the internal temperature of the battery cell under different working conditions. Therefore, this helps to solve the problem that the collected sample temperature differs sharply from the actual temperature inside the battery cell when the battery temperature is collected through the electrical connecting plate, and helps to implement real-time and accurate collection of the temperature of the battery cell.

Exemplary embodiments of this application are described below in detail with reference to drawings to make other features and advantages of this application clearer.

BRIEF DESCRIPTION OF DRAWINGS

To describe the technical solutions in the embodiments of this application more clearly, the following outlines the drawings to be used in the description of the embodiments of this application. Apparently, the drawings outlined below are merely some embodiments of this application, and a person of ordinary skill in the art may derive other drawings from the outlined drawings without making any creative efforts.

The drawings described herein are intended to enable a further understanding of this application, and constitute a part of this application. The exemplary embodiments of this application and the description thereof are intended to interpret this application, but do not constitute any undue limitation on this application.

DETAILED DESCRIPTION OF EMBODIMENTS

Figure 1:
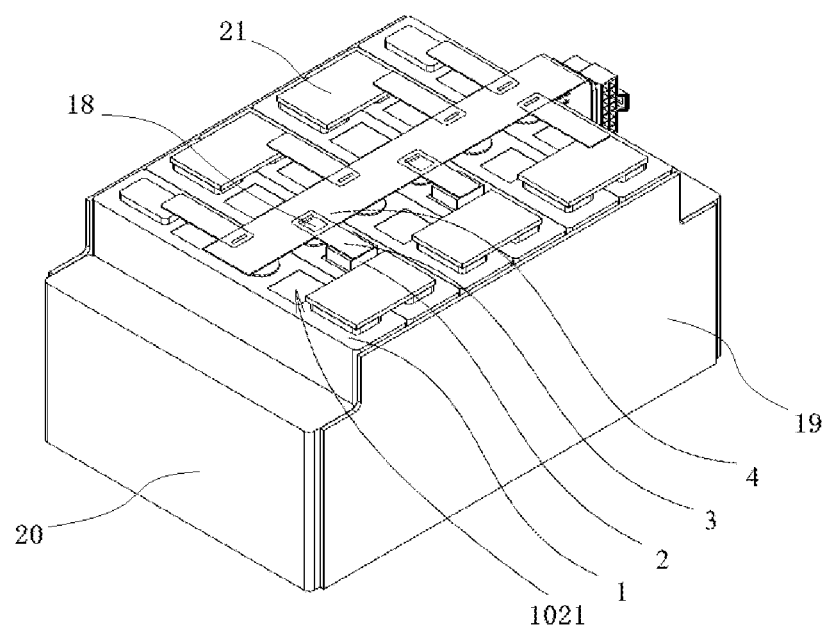
FIG. 1 is a schematic structural diagram of a battery module according to an embodiment of this application.

The following describes the technical solutions in the embodiments of this application clearly with reference to drawings. Apparently, the described embodiments are merely a part of but not all of the embodiments of this application. The following description of at least one exemplary embodiment is merely illustrative, and is in no way intended as a limitation on this application or the use thereof. All other embodiments derived by a person of ordinary skill in the art based on the embodiments of this application without making any creative efforts fall within the protection scope of this application.

Unless otherwise expressly specified, the relative arrangement of parts and steps, numerical expressions, and numerical values set forth in the embodiments do not limit the scope of this application. Understandably, for ease of description, the sizes of various parts shown in the drawings are not drawn to actual scale. The technologies, methods, and devices known to a person of ordinary skill in the related art may be described without going into details, but where appropriate, such technologies, methods, and device are regarded as a part of the granted specification. In all the examples shown and discussed herein, any specific values are construed as merely exemplary rather than restrictive. Therefore, values in other examples of the exemplary embodiment may be different. It needs to be noted that similar reference numerals and letters indicate similar items in the following drawings. Therefore, once an item is defined in one drawing, the item does not need to be further discussed in subsequent drawings.

Understandably, in the context of this application, the terms such as "first" and "second" used to qualify parts are merely intended for ease of distinguishing the parts. Unless otherwise specified, no special meaning is ascribed to such terms. Therefore, the terms are not to be understood as a limitation on the protection scope of this application.

Understandably, in the context of this application, a direction or positional relationship indicated by the directional terms such as "before", "after", "upper", "lower", "left", "right", "vertical", "perpendicular", "horizontal", "top", and "bottom" is generally a direction or positional relationship based on the illustration in the drawings, and is merely intended for ease or brevity of description of this application. Unless otherwise specified to the contrary, such directional terms do not indicate or imply that the indicated device or component is necessarily in the specified direction or necessarily constructed or operated in the specified direction. Therefore, such terms are not to be understood as a limitation on the protection scope of this application. The directional terms "in" and "out" used in connection with a part mean inward and outward directions relative to the contour of the part.

As shown in FIG. 1 to FIG. 22, an embodiment of this application provides a battery module. The battery module includes a plurality of battery cells 1, a thermally conductive sampling piece, a thermally conductive connecting plate, a thermometric element 18, and a circuit board 4.

The battery cell 1 includes a battery top cover 102. The thermally conductive sampling piece fits snugly with the battery top cover 102. A temperature sampling region 1021 is disposed on the battery top cover 102. The thermally conductive sampling piece fits snugly with the temperature sampling region 1021 on the battery top cover 102. One end of the thermally conductive connecting plate fits snugly with the thermally conductive sampling piece. The circuit board 4 is disposed above the battery top cover 102. Another end of the thermally conductive connecting plate is connected to the circuit board 4. The thermometric element 18 is electrically connected to the circuit board 4. The thermometric element 18 collects a temperature signal of the thermally conductive connecting plate and transmits the temperature signal to the circuit board 4.

In the battery module according to this embodiment of this application, a temperature sampling position is arranged on a surface of the battery top cover 102 of the battery cell 1. Heat inside the battery cell 1 can be quickly conducted to the battery top cover 102. The thermally conductive sampling piece is disposed on and fits snugly with the battery top cover 102, and then the thermally conductive connecting plate that fits snugly with the thermally conductive sampling piece is thermally coupled with the thermometric element 18. In this way, the internal temperature of the battery cell 1 can be reflected to the thermometric element 18 through the thermally conductive sampling piece and the thermally conductive connecting plate. The thermometric element 18 transmits a measured temperature signal to the circuit board 4 to implement sampling of the temperature of the battery cell 1.

The internal temperature of the battery cell 1 can be quickly conducted to the battery top cover 102, and the temperature of the battery top cover 102 is generally not inconsistent with the internal temperature of the battery cell 1 under different working conditions. Therefore, this helps to solve the problem that the collected sample temperature differs sharply from the actual temperature inside the battery cell 1 when the temperature of the battery cell 1 is collected through the electrical connecting plate, and helps to implement real-time and accurate collection of the temperature of the battery cell 1.

The heat of the battery top cover 102 is transferred to the thermometric element 18 through the thermally conductive sampling piece and the thermally conductive connecting plate. Therefore, a relative position between the thermally conductive sampling piece and the thermally conductive connecting plate may be adjusted appropriately, so as to help to reduce a stress exerted by the thermally conductive connecting plate on the circuit board 4 when close fitting is implemented between corresponding parts at contact positions on a heat transfer path.

The embodiments of this application are further described below with reference to FIG. 1 to FIG. 22.

FIG. 1 to FIG. 4 show a structure of a battery module according to an embodiment of this application.

As shown in FIG. 1, the battery module includes battery cells 1, a thermally conductive sampling piece 2, a thermally conductive connecting plate 3, a circuit board 4, a thermometric element 18, side plates 19, end plates 20, and an electrical connecting plate 21. The circuit board 4 is a flexible printed circuit board.

The plurality of battery cells 1 are arranged in an array to form a battery module. For example, in FIG. 1, 6 battery cells 1 are arranged in an array of 1 column and 6 rows. Two side plates 19 are disposed outside two opposite lateral faces of the battery module respectively. Two end plates 20 are disposed outside two opposite end faces of the battery module respectively. The two side plates 19 and the two end plates 20 define an accommodation space that accommodates the battery module. Each electrical connecting plate 21 is connected to a different battery cell 1.

Figure 2:
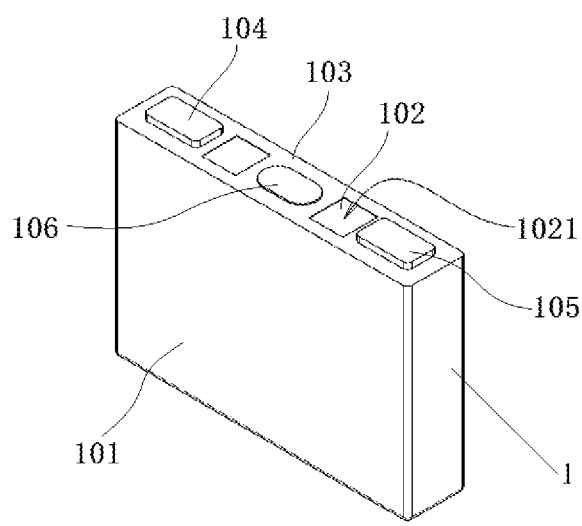
FIG. 2 is a schematic structural diagram of a battery cell of a battery module according to the embodiment shown in FIG. 1.

As shown in FIG. 2, the battery cell 1 includes a housing 101, a battery top cover 102, an electrode assembly (not shown in the drawing), a top patch 103, a positive electrode terminal 104, a negative electrode terminal 105, and an explosion-proof valve 106. The battery top cover 102 is disposed on a top of the housing 101, and combines with the housing 101 to define an accommodation portion that accommodates the electrode assembly. The positive electrode terminal 104 and the negative electrode terminal 105 are connected to a positive electrode and a negative electrode of the electrode assembly respectively, and protrude beyond the battery top cover 102. The explosion-proof valve 106 is disposed on the battery top cover 102. A temperature sampling region 1021 is disposed on the battery top cover 102.

The top patch 103 fits snugly with an upper surface of the battery top cover 102. A temperature collection opening is made on the top patch 103. A part of the battery top cover 102, which is exposed at the temperature collection opening, is the temperature sampling region 1021.

As shown in FIG. 1 and FIG. 2, in the battery module according to some embodiments, the temperature sampling region 1021 is a square region arranged between the positive electrode terminal 104 and the negative electrode terminal 105. In this embodiment, the thermally conductive sampling piece 2 fits snugly with the temperature sampling region 1021 between the explosion-proof valve 106 and the negative electrode terminal 105. In an embodiment not shown in the drawings, the position and shape of the temperature sampling region may vary depending on actual situations.

The thermometric element 18 includes a thermistor. The thermometric element 18 is connected to the thermally conductive connecting plate 3 to collect a temperature signal of the thermally conductive connecting plate 3. A temperature of the thermally conductive connecting plate 3 can represent a temperature of the battery cell 1. The circuit board 4 is disposed above the battery top covers 102 of the plurality of battery cells 1. The thermometric element 18 is electrically connected to the circuit board 4, so as to transmit the temperature signal of the thermally conductive connecting plate 3 to the circuit board 4.

As shown in FIG. 1, the thermometric element 18 is disposed on the circuit board 4, for example, electrically connected to the circuit board 4 by welding. The thermally conductive connecting plate 3 is connected to the circuit board 4 by welding. An avoidance hole is disposed at a position of the thermally conductive connecting plate 3, where the position is connected to the circuit board 4. The thermometric element 18 is located in the avoidance hole. The thermally conductive connecting plate 3 may directly contact the thermometric element 18 so as to transfer heat to the thermometric element 18. The heat of the thermally conductive connecting plate 3 may also be transferred to the thermometric element 18 through a thermally conductive adhesive.

The thermally conductive connecting plate 3 and the thermometric element 18 are connected to the circuit board 4 concurrently. A region of connection between the thermally conductive connecting plate 3 and the circuit board 4 is located around a region of connection between the thermometric element 18 and the circuit board 4. The foregoing connection manner shortens a heat transfer path from the battery cell 1 to the thermometric element 18, and helps to transmit the temperature signal of the thermally conductive connecting plate 3 to the circuit board 4 in a timelier manner.

Figure 3:
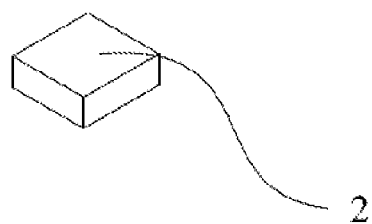
FIG. 3 is a schematic structural diagram of a thermally conductive sampling piece of a battery module according to the embodiment shown in FIG. 1.
Figure 4:
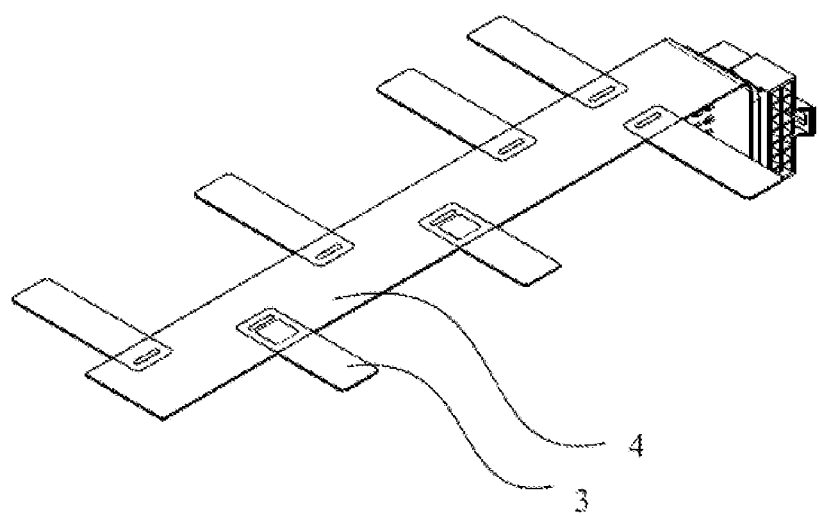
FIG. 4 is a schematic structural diagram of a composite structure formed by components such as a circuit board of a battery module and a thermally conductive connecting plate connected to the circuit board according to the embodiment shown in FIG. 1.

As shown in FIG. 1 and FIG. 3, in the battery module according to some embodiments, the thermally conductive sampling piece 2 includes a sampling block. A bottom face of the sampling block fits snugly with the temperature sampling region 1021, and a top face of the sampling block fits snugly with a bottom face of the thermally conductive connecting plate 3. The sampling block is simple in structure and is easy to manufacture and assemble.

In this embodiment, the sampling block is a square sampling block. In an embodiment not shown in the drawings, the sampling block may also be in another shape such as a cylinder. The sampling block may be made of a material such as metal or a thermally conductive non-metallic material.

As shown in FIG. 1 and FIG. 3, in this embodiment, the thermally conductive connecting plate 3 is a flat connecting plate. The thermally conductive connecting plate 3 may be made of a material such as metal or a thermally conductive non-metallic material.

In this embodiment, the thermally conductive sampling piece 2 is fixed to the temperature sampling region 1021. As an example of a fixing manner, the thermally conductive sampling piece 2 may be made of a self-adhesive material (such as silicone rubber) and directly bonded to the temperature sampling region 1021; or may be bonded by a thermally conductive adhesive or connected by welding.

In this embodiment, the thermally conductive connecting plate 3 is fixed to the thermally conductive sampling piece 2. As an example of a fixing manner, the thermally conductive sampling piece 2 may be made of a self-adhesive material (such as silicone rubber) and directly bonded to the thermally conductive connecting plate 3; or may be bonded by a thermally conductive adhesive or connected by welding.

In this embodiment, the heat in the temperature sampling region 1021 on the surface of the battery top cover 102 is conducted to the thermometric element 18 on the circuit board 4 through the thermally conductive sampling piece 2 and the thermally conductive connecting plate 3, so as to implement real-time and accurate sampling of the temperature of the battery cell 1 and monitor temperature changes of the battery cell 1.

Figure 5:
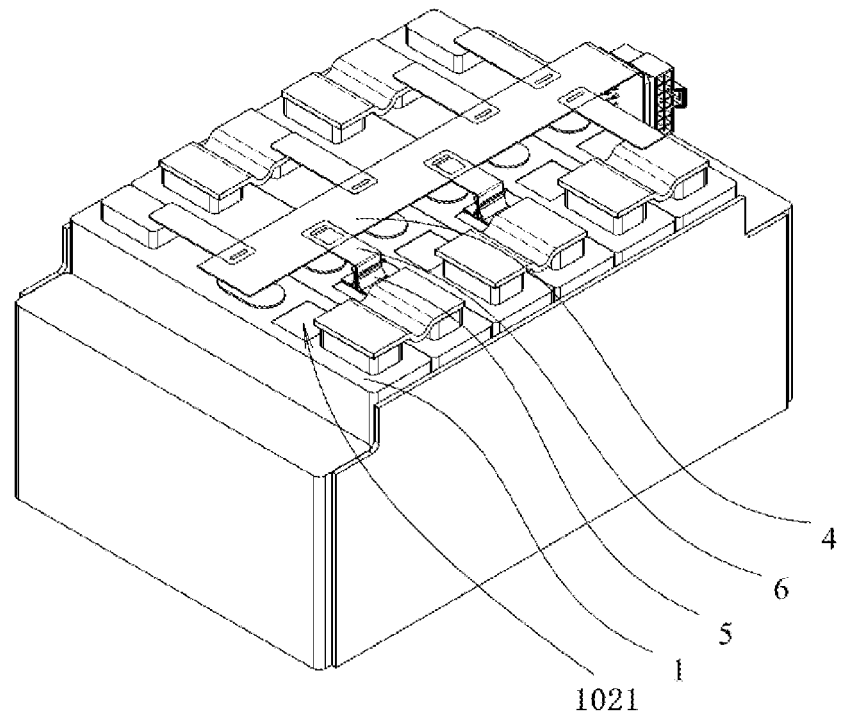
FIG. 5 is a schematic structural diagram of a battery module according to another embodiment of this application.
Figure 6:
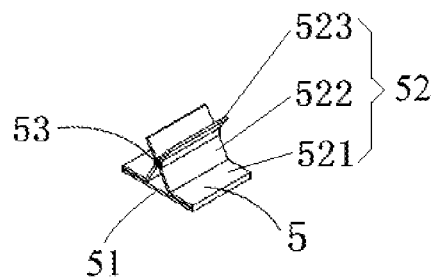
FIG. 6 is a schematic structural diagram of a thermally conductive sampling piece of a battery module according to the embodiment shown in FIG. 5.
Figure 7:
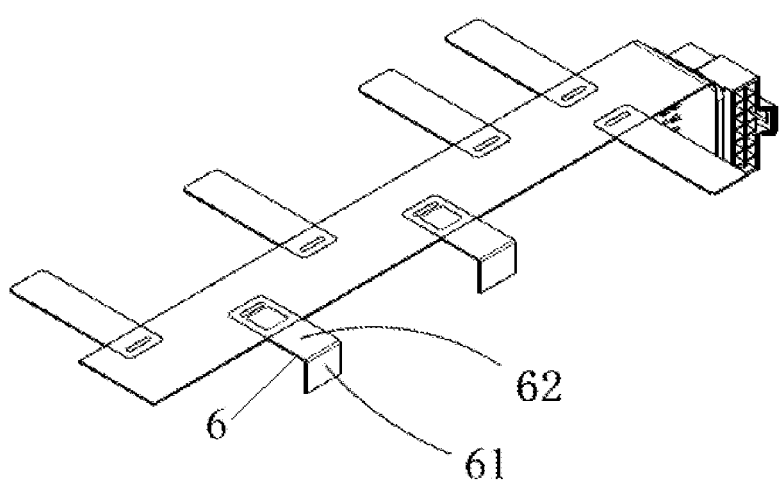
FIG. 7 is a schematic structural diagram of a composite structure formed by components such as a circuit board of a battery module and a thermally conductive connecting plate connected to the circuit board according to the embodiment shown in FIG. 5.

FIG. 5 to FIG. 7 show a structure of a battery module according to another embodiment of this application. This embodiment differs from other embodiments in structures of the thermally conductive sampling piece 5 and the thermally conductive connecting plate 6. The following describes the differences between this embodiment and the foregoing embodiments.

As shown in FIG. 5 and FIG. 6, in this embodiment, the thermally conductive sampling piece 5 includes a pedestal and a socket 53 disposed on the pedestal. The pedestal fits snugly with the temperature sampling region 1021. The thermally conductive connecting plate 6 is plugged into the socket 53, and fits snugly with a sidewall of the socket 53. The thermally conductive sampling piece 5 with the socket 53 can be assembled conveniently and quickly.

As shown in FIG. 7, the thermally conductive connecting plate 6 is a bent connecting plate. The bent connecting plate includes a first connecting portion 61 and a second connecting portion 62 that is at an angle to the first connecting portion 61. The first connecting portion 61 is plugged into the socket 53, and the second connecting portion 62 is connected to the thermometric element 18.

In this embodiment, the first connecting portion 61 is perpendicular to the battery top cover 102, and the second connecting portion 62 is parallel to the battery top cover 102. The first connecting portion 61 is at a right angle to the second connecting portion 62.

In an embodiment not shown in the drawings, the first connecting portion may be at another angle to the second connecting portion, and the position and direction of the socket are arranged in coordination with the first connecting portion. In addition, the thermally conductive connecting plate is not limited to the foregoing forms as long as the thermally conductive connecting plate coordinates with the socket of the corresponding thermally conductive sampling piece in collecting the temperature of the battery top cover 102. For example, three or more connecting portions may form a bent connecting plate as the thermally conductive connecting plate.

As shown in FIG. 6, the thermally conductive sampling piece 5 is formed by bending a strip-shaped plate. The strip-shaped plate includes a middle plate section 51 and two end plate sections 52 located at two ends of the middle plate section 51 respectively. The two end plate sections 52 each form a first end plate section part 521, a second end plate section part 522, and a third end plate section part 523 that are sequentially connected by starting from the middle plate section 51. The two first end plate section parts 521 are located above the middle plate section 51, and fold toward the middle of the middle plate section 51, and may be folded until fitting snugly with an upper surface of the middle plate section 51. From the first end plate section part 521 to which each of the two second end plate section parts 522 is connected, the two second end plate section parts continue to extend toward the middle of the middle plate section 51, and tilt toward a direction away from the upper surface of the middle plate section 51. From the second end plate section part 522 to which each of the two third end plate section parts 523 is connected, the two third end plate section parts extend toward two ends of the middle plate section 51, and tilt toward a direction away from the upper surface of the middle plate section 51.

In this embodiment, the pedestal includes the middle plate section 51 and the two first end plate section parts 521. The two second end plate section parts 522 and the two third end plate section parts 523 constitute a socket structure whose cross section is an X shape. The second end plate section part 522 and the third end plate section part 523 of one of the end plate sections 52 is spaced apart from the second end plate section part 522 and the third end plate section part 523 of the other end plate section 52, where the spacing forms the socket 53. Each second end plate section part 522 and each third end plate section part 523 form a sidewall of the socket 53.

The strip-shaped plate is bent to form the thermally conductive sampling piece 5, so as to implement easy manufacturing and mounting as well as convenient and quick use.

In an embodiment not shown in the drawings, the thermally conductive sampling piece with a socket may be another form of sampling structure so long as the sampling structure fulfils functions of the thermally conductive sampling piece and contains a socket, for example, may be a sampling block with a socket. The form of the thermally conductive connecting plate is not limited to the bent connecting plate so long as the thermally conductive connecting plate coordinates with the thermally conductive sampling piece and the thermometric element, and may also be a flat connecting plate.

For content not described in this embodiment, reference may be made to relevant description in the rest of this application.

Figure 8:
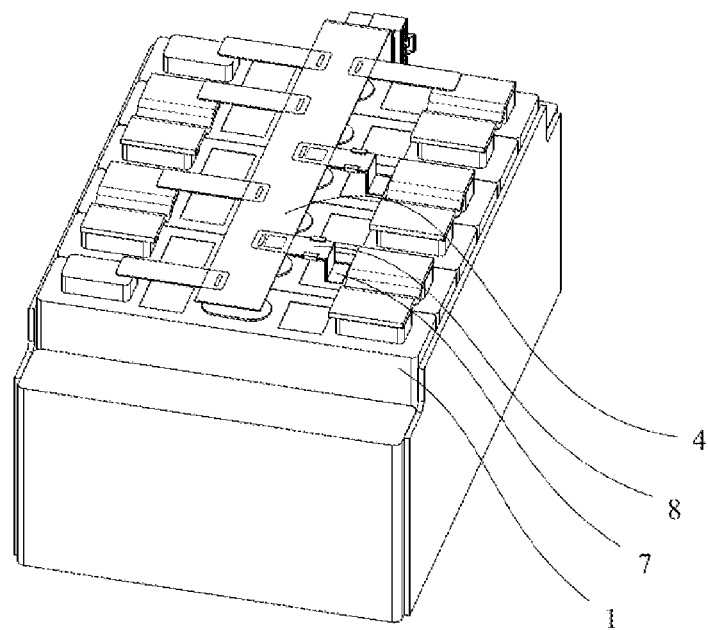
FIG. 8 is a schematic structural diagram of a battery module according to another embodiment of this application.
Figure 9:
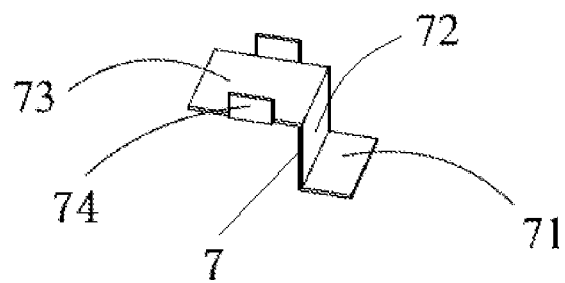
FIG. 9 is a schematic structural diagram of a thermally conductive sampling piece of a battery module according to the embodiment shown in FIG. 8.
Figure 10:
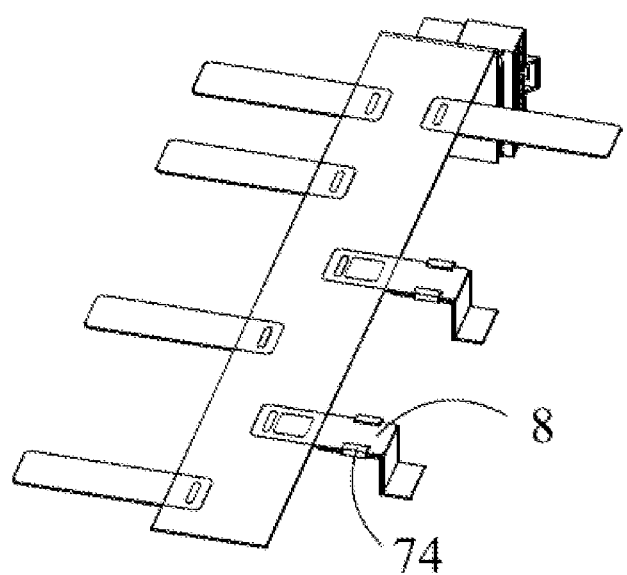
FIG. 10 is a schematic structural diagram of a composite structure formed by components such as a circuit board of a battery module, a thermally conductive connecting plate connected to the circuit board, and a thermally conductive sampling piece according to the embodiment shown in FIG. 8.

FIG. 8 to FIG. 10 show a structure of a battery module according to still another embodiment of this application. This embodiment differs from the foregoing embodiments in structures of the thermally conductive sampling piece 7 and the thermally conductive connecting plate 8. The following describes the differences between this embodiment and the foregoing embodiments.

As shown in FIG. 8 to FIG. 10, in this embodiment, the thermally conductive sampling piece 7 includes a sampling board. The sampling board includes a first sampling board 71, a second sampling board 72, and a third sampling board 73 that are sequentially connected. Both the first sampling board 71 and the third sampling board 73 extend toward a side away from a face of the second sampling board 72. The first sampling board 71 and the third sampling board 73 extend in opposite directions. The first sampling board 71 fits snugly with the temperature sampling region 1021. The third sampling board 73 fits snugly with the thermally conductive connecting plate 8.

The thermally conductive sampling piece 7 in this embodiment can adjust a relative position between the first sampling board 71 and the third sampling board 73 by appropriately adjusting angles between the first sampling board 71, the second sampling board 72, and the third sampling board 73. In this way, higher adaptability to the relative position between the thermally conductive connecting plate 8 and the battery top cover 102 is achieved, thereby helping both the thermally conductive sampling piece 7 and the thermally conductive connecting plate 8 to fit closely with the battery top cover 102, helping to ensure temperature measurement effects, and helping to reduce the stress exerted by the thermally conductive connecting plate 8 on the circuit board 4.

In some embodiments not shown in the drawings, the first sampling board and the third sampling board may extend in the same direction.

As shown in FIG. 8 and FIG. 10, the thermally conductive connecting plate 8 is a flat connecting plate. The third sampling board 73 of the thermally conductive sampling piece 7 is fixedly connected to the thermally conductive connecting plate 8.

As shown in FIG. 8 to FIG. 10, the thermally conductive sampling piece 7 includes a bendable sampling piece lug 74 disposed at an edge of the third sampling board 73. The sampling piece lug 74 is bent to fit snugly with the face of the thermally conductive connecting plate 8, so as to connect the third sampling board 73 and the thermally conductive connecting plate 8.

In this embodiment, a sampling piece lug 74 is disposed on both opposite sides of the third sampling board 73. After being bent, the sampling piece lug 74 is located above the thermally conductive connecting plate 8. The third sampling board 73 is located below the thermally conductive connecting plate 8.

In this embodiment, the sampling piece lug 74 is used as a sampling piece crimping board and disposed on the sampling board. The sampling piece crimping board is bent to fit snugly with the thermally conductive connecting plate so as to connect the thermally conductive sampling piece and the thermally conductive connecting plate. In an embodiment not shown in the drawings, the thermally conductive connecting plate may include a thermally conductive connecting plate body and a bendable connecting plate crimping board disposed on the thermally conductive connecting plate body. The connecting plate crimping board is bent to fit snugly with the thermally conductive sampling piece so as to connect the thermally conductive sampling piece and the thermally conductive connecting plate. For example, a connecting plate lug may be disposed on the thermally conductive connecting plate to serve as a connecting plate crimping board. The thermally conductive connecting plate includes a thermally conductive connecting plate body and a bendable connecting plate lug disposed at an edge of the thermally conductive connecting plate body. The connecting plate lug is bent to fit snugly with the face of the thermally conductive sampling piece so as to connect the thermally conductive sampling piece and the thermally conductive connecting plate.

In some embodiments not shown in the drawings, a connecting plate lug may also be disposed on the thermally conductive connecting plate, and a sampling piece lug may be disposed on the thermally conductive sampling piece concurrently.

In some embodiments not shown in the drawings, a position of the sampling piece lug is not limited to being arranged at the edge of the corresponding sampling board, but may also be arranged in the middle of the corresponding sampling board. Correspondingly, a socket may be made on the thermally conductive connecting plate, and may be available for plugging the sampling piece lug so as to connect the thermally conductive sampling piece and the thermally conductive connecting plate. When the connecting plate lug is disposed on the thermally conductive connecting plate body, the connecting plate lug may also be disposed in the middle of the thermally conductive connecting plate, and a socket is made on the thermally conductive sampling piece and is available for plugging the connecting plate lug so as to connect the thermally conductive sampling piece and the thermally conductive connecting plate.

For content not described in this embodiment, reference may be made to relevant description in the rest of this application.

FIG. 11 to FIG. 14 show a structure of a battery module according to still another embodiment of this application. This embodiment differs from the foregoing embodiments in structures of the thermally conductive sampling piece 9 and the thermally conductive connecting plate 10. The following describes the differences between this embodiment and the foregoing embodiments.

As shown in FIG. 11 to FIG. 14, in this embodiment, the thermally conductive sampling piece 9 includes a sampling board. The sampling board includes a first sampling board 91, a second sampling board 92, and a third sampling board 93 that are sequentially connected. Both the first sampling board 91 and the third sampling board 93 extend toward a side away from a face of the second sampling board 92. The first sampling board 91 and the third sampling board 93 extend in opposite directions. The first sampling board 91 fits snugly with the temperature sampling region 1021. The third sampling board 93 fits snugly with the thermally conductive connecting plate 10.

Figure 12:
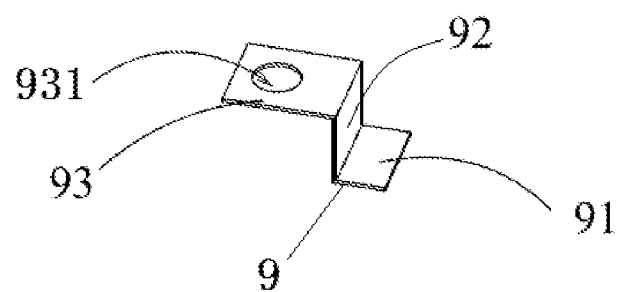
FIG. 12 is a schematic structural diagram of a thermally conductive sampling piece of a battery module according to the embodiment shown in FIG. 11.
Figure 13:
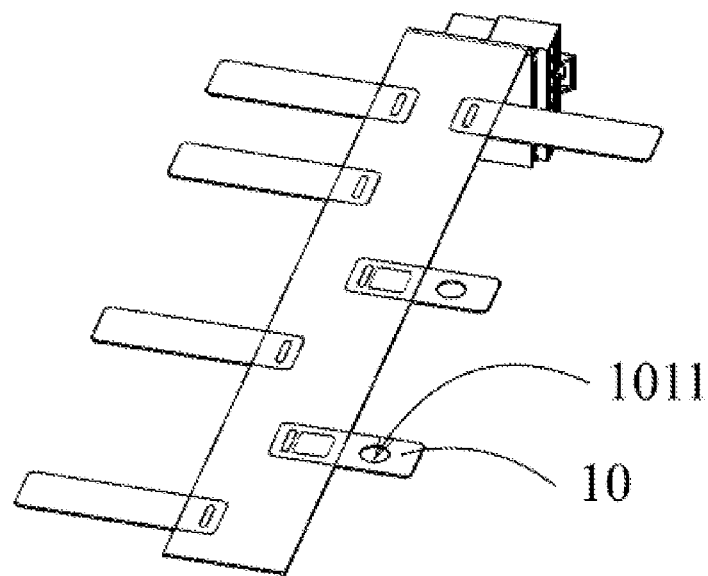
FIG. 13 is a schematic structural diagram of a composite structure formed by components such as a circuit board of a battery module and a thermally conductive connecting plate connected to the circuit board according to the embodiment shown in FIG. 11.

As shown in FIG. 12, a first connecting hole 931 is disposed on the third sampling board 93. As shown in FIG. 13, the thermally conductive connecting plate 10 is a flat connecting plate. A second connecting hole 1011 is disposed on the thermally conductive connecting plate 10.

Figure 11:
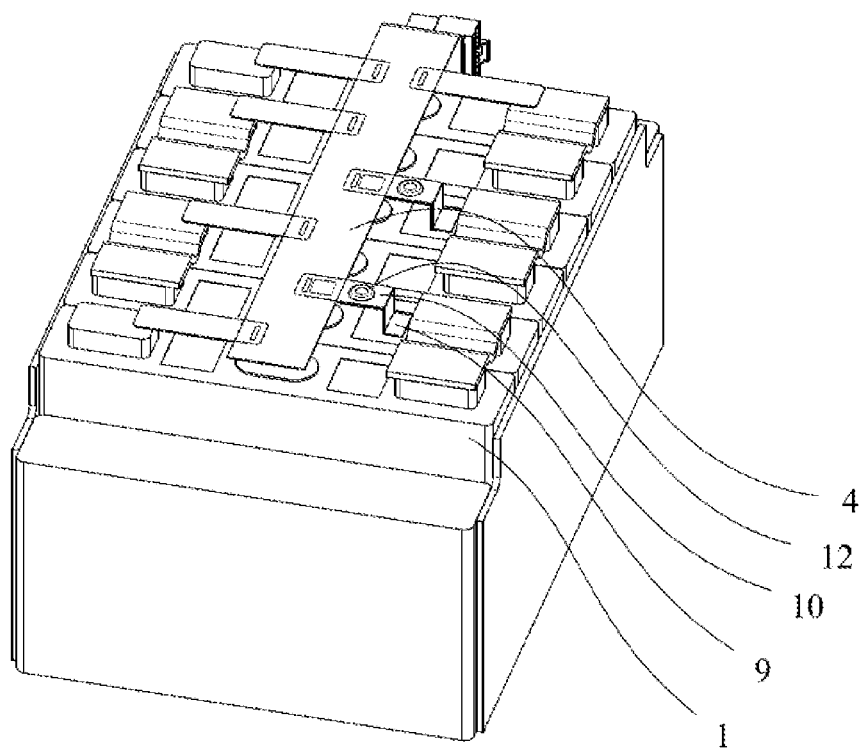
FIG. 11 is a schematic structural diagram of a battery module according to another embodiment of this application.
Figure 14:
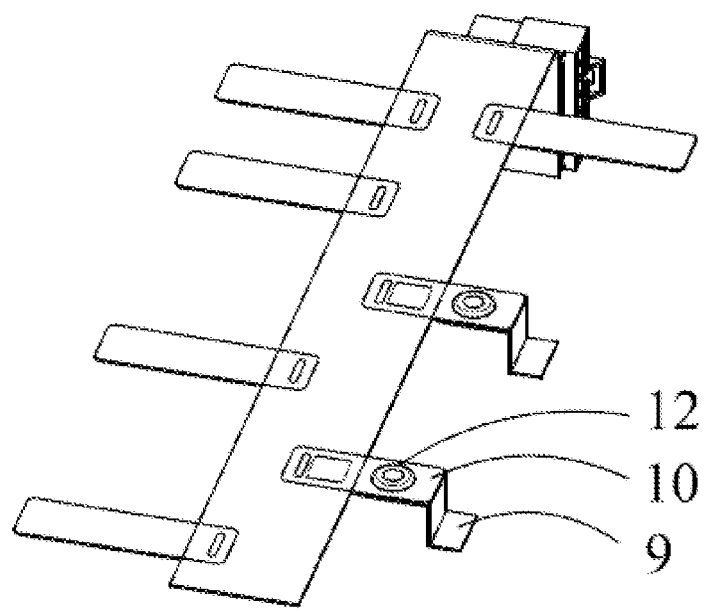
FIG. 14 is a schematic structural diagram of a composite structure formed by components such as a circuit board of a battery module, a thermally conductive connecting plate connected to the circuit board, and a thermally conductive sampling piece according to the embodiment shown in FIG. 11.

As shown in FIG. 11 and FIG. 14, the third sampling board 94 is connected to the thermally conductive connecting plate 10 by a rivet 12 threaded through the first connecting hole 931 and the second connecting hole 1011.

For content not described in this embodiment, reference may be made to relevant description in the rest of this application.

FIG. 15 to FIG. 18 show a structure of a battery module according to still another embodiment of this application. This embodiment differs from the foregoing embodiments in structures of the thermally conductive sampling piece 13 and the thermally conductive connecting plate 14. The following describes the differences between this embodiment and the foregoing embodiments.

Figure 15:
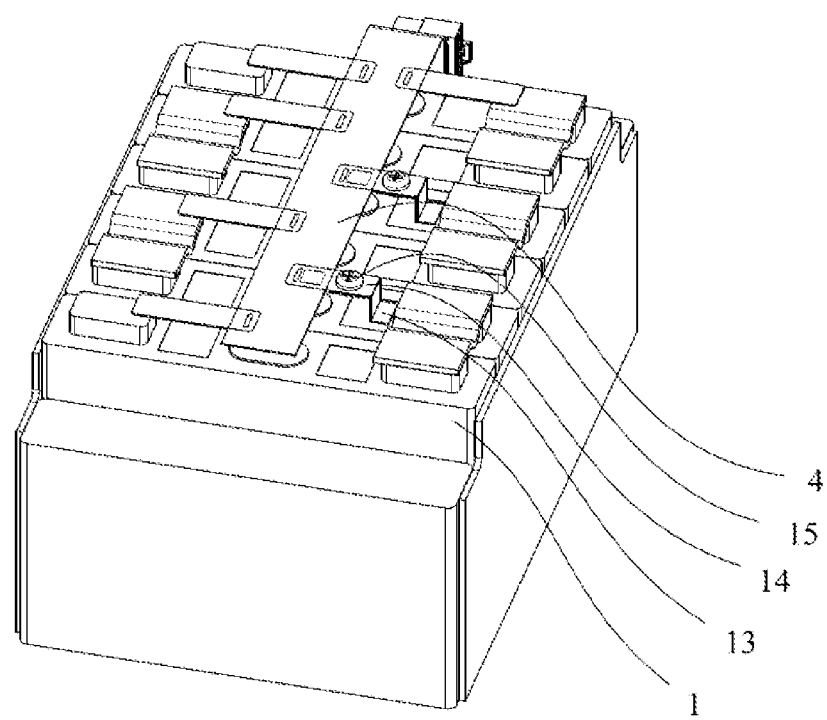
FIG. 15 is a schematic structural diagram of a battery module according to another embodiment of this application.
Figure 16:
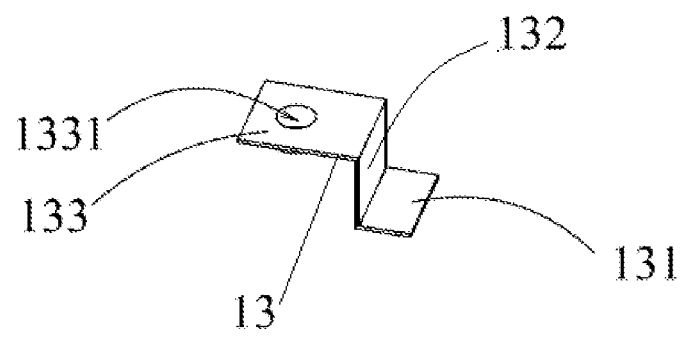
FIG. 16 is a schematic structural diagram of a thermally conductive sampling piece of a battery module according to the embodiment shown in FIG. 15.
Figure 18:
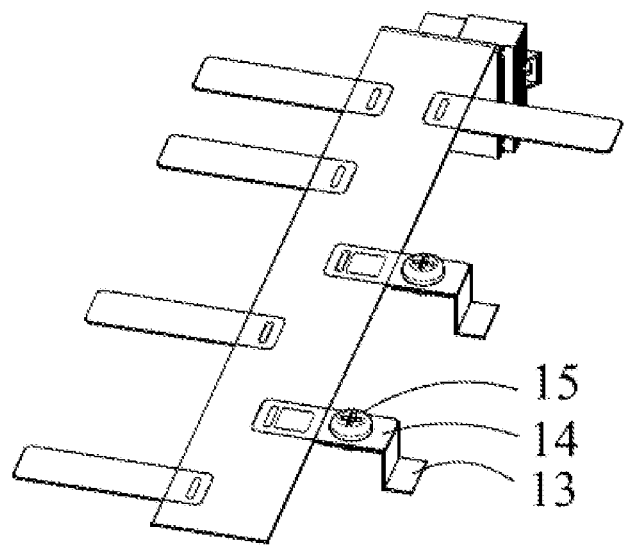
FIG. 18 is a schematic structural diagram of a composite structure formed by components such as a circuit board of a battery module, a thermally conductive connecting plate connected to the circuit board, and a thermally conductive sampling piece according to the embodiment shown in FIG. 15.

As shown in FIG. 15, FIG. 16, and FIG. 18, in this embodiment, the thermally conductive sampling piece 13 includes a sampling board. The sampling board includes a first sampling board 131, a second sampling board 132, and a third sampling board 133 that are sequentially connected. Both the first sampling board 131 and the third sampling board 133 extend toward a side away from a face of the second sampling board 132. The first sampling board 131 and the third sampling board 133 extend in opposite directions. The first sampling board 131 fits snugly with the temperature sampling region 1021. The third sampling board 133 fits snugly with the thermally conductive connecting plate 14.

Figure 17:
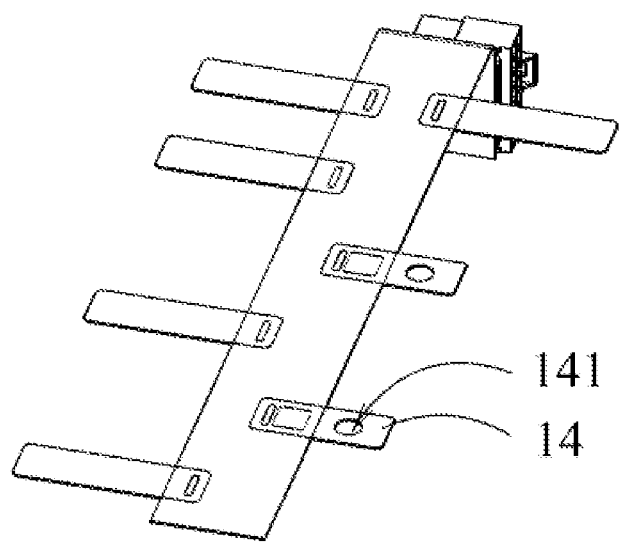
FIG. 17 is a schematic structural diagram of a composite structure formed by components such as a circuit board of a battery module and a thermally conductive connecting plate connected to the circuit board according to the embodiment shown in FIG. 15.

As shown in FIG. 16, a third connecting hole 1331 is disposed on the third sampling board 133. As shown in FIG. 17, the thermally conductive connecting plate 14 is a flat connecting plate. A fourth connecting hole 141 is disposed on the thermally conductive connecting plate 14.

As shown in FIG. 15 and FIG. 18, the third sampling board 133 is connected to the thermally conductive connecting plate 14 by a screw 15 that is threaded through the fourth connecting hole 141 and that fits threads of the third connecting hole 1331. The fourth connecting hole 141 may be a threaded hole that fits the screw 15, and the fourth connecting hole 141 may also be a smooth hole. When the fourth connecting hole 141 is a smooth hole, the third sampling board 133 may be connected to the thermally conductive connecting plate 14 by a self-tapping screw, or the third sampling board 133 may be connected to the thermally conductive connecting plate 14 by fitting a screw into a nut.

When the screw 15 directly fits the threads of the thermally conductive sampling piece 13, in order to connect the screw 15 and the thermally conductive sampling piece 13 more stably, as shown in FIG. 16, an annular bulge that protrudes downward beyond a lower surface of the third sampling board 133 is disposed at a position that corresponds to the third connecting hole 1331 and that is on the third sampling board 133. In this way, the screw 15 also fits threads of the annular bulge, so as to lengthen the connection with the thermally conductive sampling piece 13. For content not described in this embodiment, reference may be made to relevant description in the rest of this application.

FIG. 19 to FIG. 22 show a structure of a battery module according to still another embodiment of this application.

Figure 19:
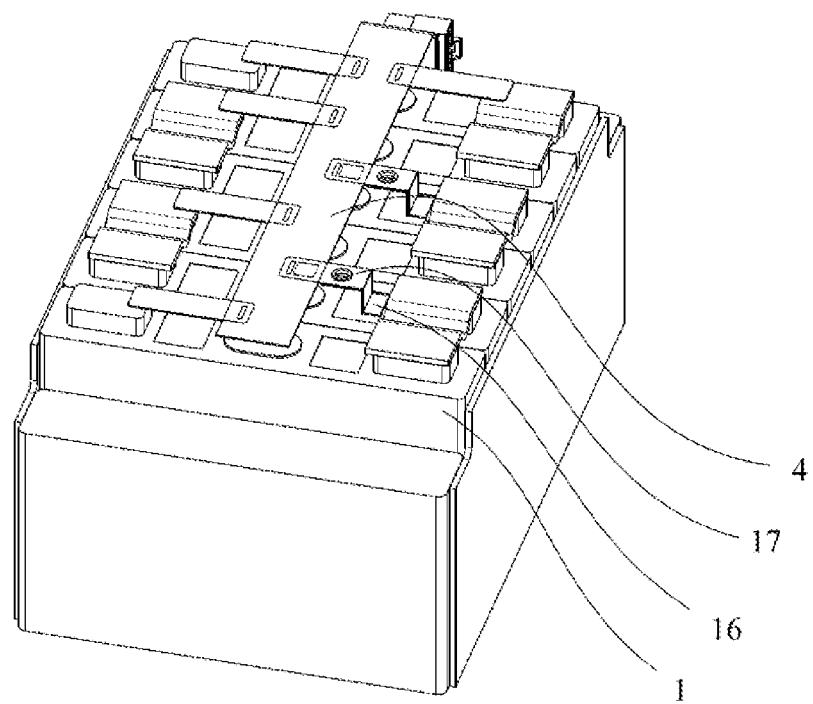
FIG. 19 is a schematic structural diagram of a battery module according to another embodiment of this application.
Figure 20:
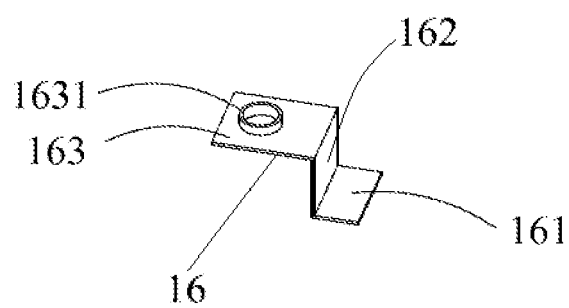
FIG. 20 is a schematic structural diagram of a thermally conductive sampling piece of a battery module according to the embodiment shown in FIG. 19.
Figure 22:
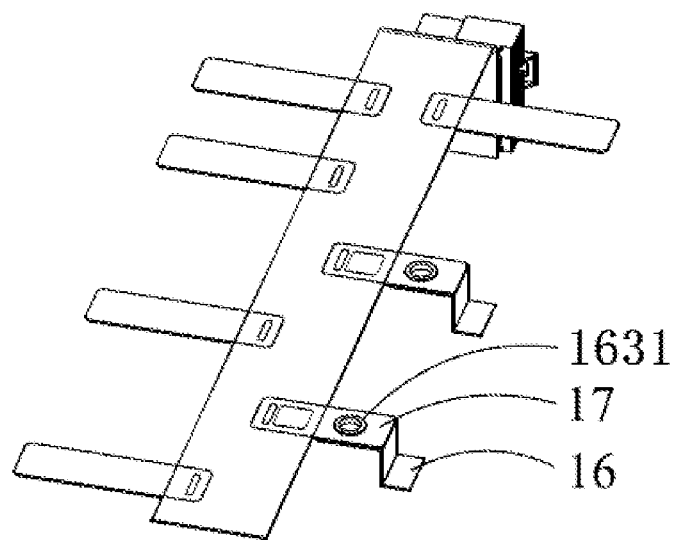
FIG. 22 is a schematic structural diagram of a composite structure formed by components such as a circuit board of a battery module, a thermally conductive connecting plate connected to the circuit board, and a thermally conductive sampling piece according to the embodiment shown in FIG. 19.

This embodiment differs from the foregoing embodiments in structures of the thermally conductive sampling piece 16 and the thermally conductive connecting plate 17. The following describes the differences between this embodiment and the foregoing embodiments. As shown in FIG. 19, FIG. 20, and FIG. 22, in this embodiment, the thermally conductive sampling piece 16 includes a sampling board. The sampling board includes a first sampling board 161, a second sampling board 162, and a third sampling board 163 that are sequentially connected. Both the first sampling board 161 and the third sampling board 163 extend toward a side away from a face of the second sampling board 162. The first sampling board 161 and the third sampling board 163 extend in opposite directions. The first sampling board 161 fits snugly with the temperature sampling region 1021. The third sampling board 163 fits snugly with the thermally conductive connecting plate 17.

Figure 21:
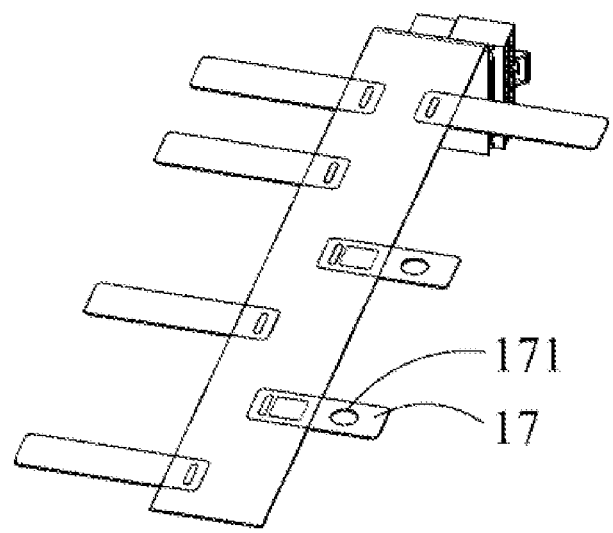
FIG. 21 is a schematic structural diagram of a composite structure formed by components such as a circuit board of a battery module and a thermally conductive connecting plate connected to the circuit board according to the embodiment shown in FIG. 19.

As shown in FIG. 20, a bendable sampling piece convex ring 1631 that extends from a face of the third sampling board 163 to a side away from the face is disposed on the third sampling board 163. As shown in FIG. 21, the thermally conductive connecting plate 17 is a flat connecting plate. A sampling piece convex ring hole 171 available for threading the sampling piece convex ring 1631 is disposed on the thermally conductive connecting plate 17. After being threaded through the sampling piece convex ring hole 171, the sampling piece convex ring 1631 is bent to fit snugly with a face of the thermally conductive connecting plate 17 of the sampling board so as to connect the thermally conductive connecting plate 17 and the third sampling board 163.

In this embodiment, the sampling piece convex ring 1631 is a flat cylindrical sampling piece convex ring. After the thermally conductive connecting plate 17 fits snugly with the third sampling board 163, the flat cylindrical sampling piece convex ring needs to be rolled outward radially to form a flange structure by using a tool, so that the third sampling board 163 and the thermally conductive connecting plate 17 are fitted snugly and connected fixedly.

In this embodiment, the sampling piece convex ring 1631 is used as a form of the sampling piece crimping board and disposed on the sampling board. The sampling piece convex ring 1631 is bent to fit snugly with the thermally conductive connecting plate so as to connect the thermally conductive sampling piece and the thermally conductive connecting plate.

In some embodiments not shown in the drawings, the thermally conductive connecting plate may include a connecting plate convex ring. The thermally conductive connecting plate contains a connecting plate body and a bendable connecting plate convex ring that is disposed on the connecting plate body and that extends from a face of the connecting plate body to a side away from the face. A sampling piece convex ring hole available for threading the connecting plate convex ring is disposed on the thermally conductive sampling piece. The connecting plate convex ring is threaded through the sampling piece convex ring hole and then bent to fit snugly with the thermally conductive sampling piece so as to connect the thermally conductive connecting plate and the thermally conductive sampling piece.

In an embodiment not shown in the drawings, the connecting plate convex ring is used as a form of the connecting plate crimping board and disposed on the connecting plate body. The connecting plate convex ring is bent to fit snugly with the thermally conductive sampling piece so as to connect the thermally conductive sampling piece and the thermally conductive connecting plate.

In some embodiments not shown in the drawings, a connecting plate convex ring may be disposed on the thermally conductive connecting plate body while a sampling piece convex ring is disposed on the thermally conductive sampling piece.

For content not described in this embodiment, reference may be made to relevant description in the rest of this application.

This application is not limited to the foregoing embodiments. For example, for the flat connecting plate mentioned in the foregoing embodiments, the thermally conductive connecting plate may also be a bent connecting plate in some embodiments not shown in the drawings, depending on actual needs. For another example, the third sampling board mentioned in the foregoing embodiments is located below the thermally conductive connecting plate. In some embodiments not shown in the drawings, the third sampling board may also be located above the thermally conductive connecting plate. For still another example, for the connection between the third sampling board and the thermally conductive connecting plate in the foregoing embodiments, various connection forms thereof are applicable to a connection between a sampling board of other shapes and the thermally conductive connecting plate.

Finally, it needs to be noted that the foregoing embodiments are merely intended for describing the technical solutions of this application but not intended as a limitation on this application. Although this application is described in detail with reference to optional embodiments, a person of ordinary skill in the art understands that the specific embodiments of this application can still be modified or some technical features thereof may be replaced equivalently. Such modifications and equivalent replacements fall within the scope of the technical solutions claimed by this application.

What is claimed is:

1. A battery module, comprising:
   a plurality of battery cells, wherein each battery cell comprises a battery top cover, a positive electrode terminal, a negative electrode terminal, and a temperature sampling region is disposed on the battery top cover and between the positive electrode terminal and the negative electrode terminal;
   an electrical connecting plate, configured to connect to different battery cells;
   a thermally conductive sampling piece, fixed to the temperature sampling region of the battery top cover to fit with the temperature sampling region of the battery top cover, the thermally conductive sampling piece comprises a sampling board;
   a thermally conductive connecting plate, wherein one end of the thermally conductive connecting plate is fixed to the sampling board of the thermally conductive sampling piece to fit with the sampling board;
   a circuit board, disposed above the battery top cover, wherein another end of the thermally conductive connecting plate is connected to the circuit board; and
   a thermometric element, electrically connected to the circuit board, disposed above the circuit board, and not overlapping the temperature sampling region, wherein the thermometric element is configured to collect a temperature signal of the thermally conductive connecting plate and transmit the temperature signal to the circuit board, and the heat in the temperature sampling region on the surface of the battery top cover is conducted horizontally and vertically to the thermometric element on the circuit board through the thermally conductive sampling piece and the thermally conductive connecting plate.

2. The battery module according to claim 1, wherein the sampling board comprises a first sampling board section fitting with the battery top cover, a third sampling board section fitting with the thermally conductive connecting plate, and a second sampling board section that connects the first sampling board section and the second sampling board section.

3. The battery module according to claim 2, wherein the sampling board is bent, the first sampling board section and the third sampling board section are located on two sides of the second sampling board section respectively, and extend in a direction away from the second sampling board section.

4. The battery module according to claim 1, wherein,
the thermally conductive sampling piece comprises a bendable sampling piece crimping board disposed on the sampling board, and the sampling piece crimping board is bent to fit with the thermally conductive connecting plate so as to connect the thermally conductive sampling piece and the thermally conductive connecting plate; and/or
the thermally conductive connecting plate comprises a thermally conductive connecting plate body and a bendable connecting plate crimping board disposed on the thermally conductive connecting plate body, and the connecting plate crimping board is bent to fit with the thermally conductive sampling piece so as to connect the thermally conductive sampling piece and the thermally conductive connecting plate.

5. The battery module according to claim 4, wherein,
the sampling piece crimping board comprises a bendable sampling piece lug disposed on the sampling board; and/or
the connecting plate crimping board comprises a connecting plate lug disposed on the thermally conductive connecting plate body.

6. The battery module according to claim 4, wherein
the sampling piece crimping board comprises a bendable sampling piece convex ring that extends from a face of the sampling board to a side away from the face, a sampling piece convex ring hole available for threading the sampling piece convex ring is disposed on the thermally conductive connecting plate, and the sampling piece convex ring is threaded through the sampling piece convex ring hole and then bent to fit with the thermally conductive connecting plate so as to connect the thermally conductive connecting plate and the thermally conductive sampling piece; and/or
the connecting plate crimping board comprises a bendable connecting plate convex ring that extends from a face of the connecting plate body to a side away from the face, a connecting plate convex ring hole available for threading the connecting plate convex ring is disposed on the sampling board, and the connecting plate convex ring is threaded through the connecting plate convex ring hole and then bent to fit with the thermally conductive sampling piece so as to connect the thermally conductive connecting plate and the thermally conductive sampling piece.

7. The battery module according to claim 1, wherein the sampling board is connected to the thermally conductive connecting plate by a fastener and/or a binder.

8. The battery module according to claim 1, wherein the thermally conductive connecting plate is a flat connecting plate or a bent connecting plate.

9. The battery module according to claim 1, wherein the thermally conductive sampling piece comprises a pedestal and a socket disposed on the pedestal, the pedestal fits with the battery top cover, and the thermally conductive connecting plate is plugged into the socket and fits with a sidewall of the socket.

10. The battery module according to claim 9, wherein the thermally conductive sampling piece is formed by bending a strip-shaped plate.

11. The battery module according to claim 9, wherein the thermally conductive connecting plate is a bent connecting plate, and comprises a first connecting portion and a second connecting portion that is at an angle to the first connecting portion, the first connecting portion is plugged into the socket, and the second connecting portion is connected to the circuit board.

12. A vehicle, comprising:
a power source, wherein the power source provides power to the vehicle; and
a battery module, wherein the battery module is configured to provide electrical power to the power source, and the battery module comprises:
a plurality of battery cells, wherein each battery cell comprises a battery top cover, a positive electrode terminal, a negative electrode terminal, and a temperature sampling region is disposed on the battery top cover and between the positive electrode terminal and the negative electrode terminal;
an electrical connecting plate, configured to connect to different battery cells;
a thermally conductive sampling piece, fixed to the temperature sampling region of the battery top cover to fit with the temperature sampling region of the battery top cover;
a thermally conductive connecting plate, wherein one end of the thermally conductive connecting plate is fixed to the sampling board of the thermally conductive sampling piece to fit with the sampling board;
a circuit board, disposed above the battery top cover, wherein another end of the thermally conductive connecting plate is connected to the circuit board; and
a thermometric element, electrically connected to the circuit board, disposed above the circuit board, and not overlapping the temperature sampling region, wherein the thermometric element is configured to collect a temperature signal of the thermally conductive connecting plate and transmit the temperature signal to the circuit board, and the heat in the temperature sampling region on the surface of the battery top cover is conducted horizontally and vertically to the thermometric element on the circuit board through the thermally conductive sampling piece and the thermally conductive connecting plate.

* * * * *

UNITED STATES PATENT AND TRADEMARK OFFICE
CERTIFICATE OF CORRECTION

| | | |
|---|---|---|
| PATENT NO. | : 12,142,740 B2 | Page 1 of 1 |
| APPLICATION NO. | : 17/563883 | |
| DATED | : November 12, 2024 | |
| INVENTOR(S) | : Weihua Mo | |

It is certified that error appears in the above-identified patent and that said Letters Patent is hereby corrected as shown below:

On the Title Page

Item [73], insert --Contemporary Amperex Technology (Hong Kong) Limited,--

Signed and Sealed this
Twenty-third Day of September, 2025

John A. Squires
*Director of the United States Patent and Trademark Office*